(12) United States Patent
Schramek

(10) Patent No.: US 6,904,396 B1
(45) Date of Patent: Jun. 7, 2005

(54) SYSTEM AND METHOD FOR DETERMINING AND COMMUNICATING PROGRESS TOWARD ACHIEVING OPTIMAL MOTOR VEHICLE CHARACTERISTICS

(75) Inventor: Joseph E Schramek, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 454 days.

(21) Appl. No.: 09/532,379

(22) Filed: Mar. 21, 2000

(51) Int. Cl.⁷ .............................................. G06G 7/48
(52) U.S. Cl. ............................................ 703/8; 707/10
(58) Field of Search ................................ 703/8; 707/10

(56) References Cited

PUBLICATIONS

Juran on Quality Control by Design, by J.M. Juran, The Free Press, 1992, ISBN 0–02–916683–7, pp. 462–467.*
Handbook of Industrial Engineering, Second Edition, John Wiley & Sons, Inc., 1992, ISBN 0–471–50276–6, section IVG Quality Assurance, pp. 2219–2396.*
Consumer Reports'1999 refers to the New Car Buying Guide, published by Consumer Reports, Jun. 1999, pp. 54–57, 123.*
The Computer Science and Engineering Handbook, by Allen B. Tucker, Jr. (Editor–in–chief), CRC Press, ISBN: 0–8493–2909–4, 1996, p. 1520.*

* cited by examiner

*Primary Examiner*—Kevin J. Teska
*Assistant Examiner*—Ed Garcia-Otero
(74) *Attorney, Agent, or Firm*—Gigette M. Bejin; Brooks Kushman P.C.

(57) ABSTRACT

A method and system is provided for determining the progress toward the achievement of best-in-class motor vehicles. The method may be comprised of several steps. First, internal organizational data is gathered. [The internal organizational data includes critical design characteristics, critical manufacturing characteristics, and critical performance characteristics. The critical design characteristics are those design features which are historically valued by customers. The critical manufacturing characteristics are those manufacturing features which are have also been valued by customers. The critical performance characteristics are those performance characteristics valued by customers.] Second, external organizational data is gathered. [The external organizational data includes a list of design characteristics and manufacturing characteristics that are deemed important by suppliers and competitors.] Third, the internal organizational data and the external organizational data is matched to create a list of common critical characteristics. Fourth, tests are performed to independently determine [design and manufacturing] characteristics that are critical to excellent product performance. Fifth, matching the test results to the list of common elements to assess the validity of the list and to determine final critical design, manufacturing and performance characteristics. Sixth, designating assessment categories for each final critical characteristic. [The assessment categories include but are not limited to a "STOP" category, a "CAUTION" category, and a "GO" category. The "STOP" category is defined by a range of values which illustrate poor performance/development levels, Design and/or manufacturing features which fall within this category flags this feature as being in need of a repair. The "CAUTION" category is defined by a range of values which illustrate slightly less than satisfactory performance. Design and/or manufacturing features which fall within this category flags this feature as requiring a change to the development progress. The "GO" category is defined by a range of values which illustrate acceptable performance. Design, manufacturing and performance features which fall within this category flags this feature as meeting the identified requirements. The last step involves assigning a STOP, CAUTION or GO designation to each final critical design, manufacturing, and performance characteristic.]

23 Claims, 2 Drawing Sheets

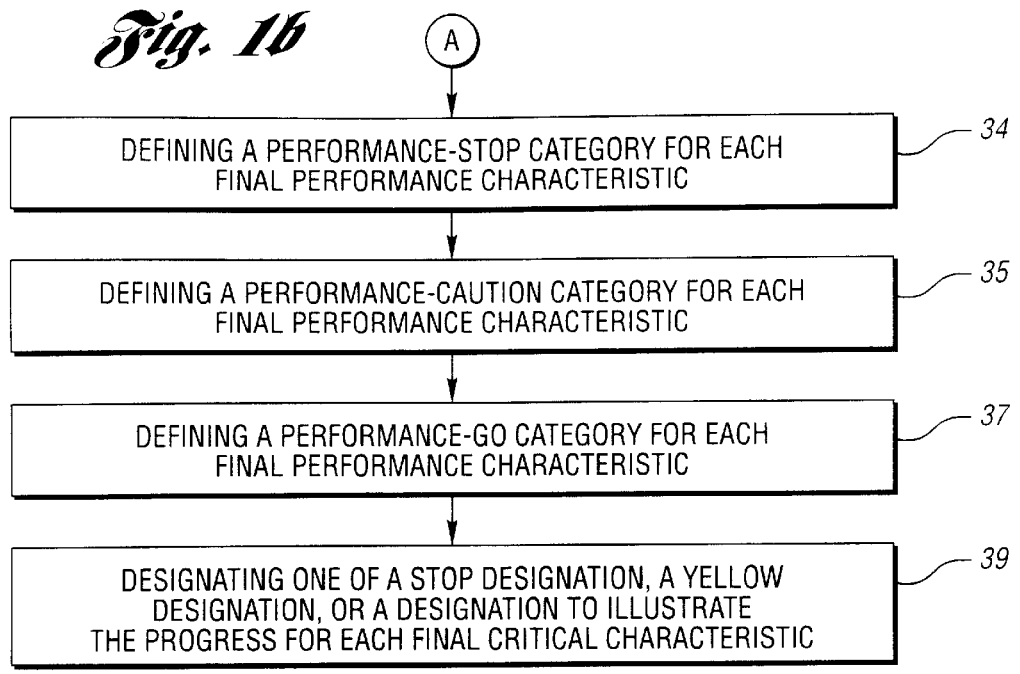

SYSTEM AND METHOD FOR DETERMINING AND COMMUNICATING PROGRESS TOWARD ACHIEVING OPTIMAL MOTOR VEHICLE CHARACTERISTICS

TECHNICAL FIELD

This invention generally relates to the area of development assessment.

BACKGROUND ART

Determining the progress of multifaceted processes is a challenge for many companies. The challenge is based upon (1) determining the relevant features to promote through design, manufacture, and/or performance improvement; (2) tracking the progress toward achieving certain goals with respect to the relevant features; and (3) conveying the progress for each feature to decision-makers of the company.

Companies, particularly automotive companies, are required to track several vehicle components of several different vehicles. In doing so, automotive companies have historically set internal goals for each component or feature of the vehicle, internal goals for achieving certain performance features, in addition to internal goals for the overall vehicle. However, companies are challenged with the task of accurately tracking the progress toward achieving each goal for each feature or characteristic. Furthermore, it is also difficult to convey the myriad of information in an efficient manner to decision-makers of a company such as vice-presidents and managers. Conveying such information usually entails general presentations to management which may not accurately convey the progress information in a format that is easy to understand in a short amount of time. For example, upper management may inquire about the development of a windshield wiper's ability to cycle "X" times per minute. The response may be that the windshield wiper is not quite able to achieve "X" cycles but achievement of this goal is imminent. However, this type of response may not provide upper management with the means to accurately measure the gravity of the situation. Further, specifically defined parameters may not be available for management to assess the progress toward achieving a particular goal.

The task of determining critical design and manufacturing features also poses its own challenges. Companies, in virtually every industry, seek to achieve high customer satisfaction which requires in part, excellent product performance and a minimal number of repairs. Excellent product performance requires that the customers wants and needs are met by the product. A minimal number of repairs will result in increased customer satisfaction as well as reduced cost to the manufacturer. As noted, automotive companies, like many other companies, set internal goals for particular manufacturing and design features that the company deems to be critical to maintaining or improving sales. However, customers may have a different opinion. Therefore, the products manufactured are industry driven rather than being driven by customer wants and needs.

Consequently, a need has developed for a system which accurately tracks the progress toward achieving design, manufacturing and performance characteristics that are critical to customer satisfaction and excellent product performance. A need has also developed for a system which efficiently and effectively conveys accurate information regarding development progress. A need has also developed for a method which determines the design, manufacturing and performance characteristics which are critical to high customer satisfaction and reduced warranty repairs.

DISCLOSURE OF INVENTION

It is an object of this invention to provide a method for determining the design, manufacturing and performance characteristics that are critical to customers.

It is also an object of this invention to provide a system which accurately tracks the progress toward achieving critical design, manufacturing and/or performance characteristics.

It is yet another object of this invention to provide a system which efficiently and accurately conveys the progress of achieving predetermined goals at a glance.

A more specific object is to provide a method for efficiently and accurately measuring the progress of achieving optimal motor vehicle characteristics according to the customer point-of-view. The method is comprised of several steps. First, internal organizational data is gathered. The internal organizational data includes critical design characteristics, critical manufacturing characteristics, and critical performance characteristics. The critical design characteristics are those design features which are historically valued by customers. The critical manufacturing characteristics are those manufacturing features which are also valued by customers and the critical performance characteristics constitute performance features sought by customers. The various performance characteristics allow manufacturers to measure how well various components of the product work together to produce best-in-class results. Best-in-class results are those results which produce the highest levels of customer satisfaction according to publications such as Consumer Reports and J.D. Powers. Second, external organizational data is gathered. The external organizational data includes a list of design characteristics, manufacturing characteristics, and performance characteristics that are deemed important by suppliers and competitors. Third, the internal organizational data and the external organizational data is matched to create a list of common critical characteristics. Fourth, experimental tests are performed to independently determine design and manufacturing characteristics that are critical to excellent product performance. Fifth, matching the experimental test results to the list of common elements to determine final critical design characteristics, final critical manufacturing characteristics, and/or final critical performance characteristics. Sixth, designating assessment categories for each critical characteristic. The assessment categories include but are not limited to a "STOP" category, a "CAUTION" category, and a "GO" category. The "STOP" category is defined by a range of values which illustrate poor performance/development levels. Design, manufacturing, or performance features which fall within this category flags the feature as being in need of a repair. The "CAUTION" category is defined by a range of values which illustrate slightly less than satisfactory performance. Design, manufacturing and performance features which fall within this category flags the feature as requiring a change to the development progress. The "GO" category is defined by a range of values which illustrate acceptable performance. Design, manufacturing, and/or performance features which fall within this category flags this feature as meeting the identified requirements. The last step involves assigning a corresponding STOP, CAUTION or GO designation to each final critical design, manufacturing and/or performance characteristic.

The final critical design, manufacturing, and/or performance characteristics may be presented in a spreadsheet format where the characteristics are listed and designated by color. Stop status may be designated in red. Caution status may be designated in yellow. Go status may be designated in Green.

It is yet another object to provide a system and method which may only track either the manufacturing characteristics, design characteristics, or performance characteristics. In yet another embodiment of the present invention, other characteristics not pertaining to design manufacture or performance may be determined and tracked. This system and method is not limited to an automotive environment and applies to any industry where the development of a multifaceted system must be monitored.

The above objects and other objects, features and advantages of the present invention are more readily understood of the attached drawings and the accompanying specification and claims.

BRIEF DESCRIPTION OF DRAWINGS

FIGS. 1a and 1b are flow diagrams which illustrate the method steps for the first embodiment of this invention; and FIG. 2 illustrates a color-coded spreadsheet for conveying information regarding progress.

BEST MODE FOR CARRYING OUT THE INVENTION

Figure 1A:
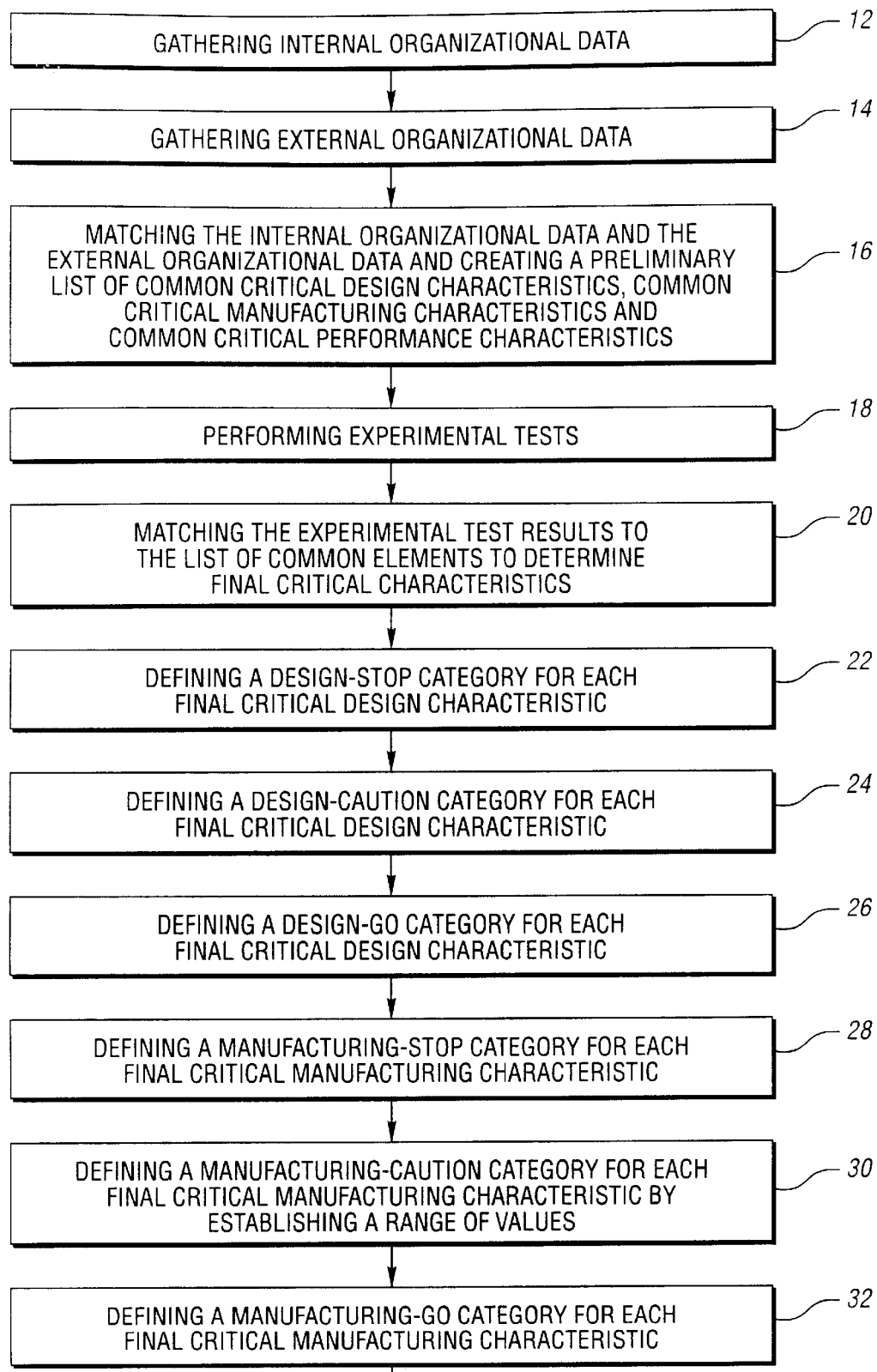

With reference to FIG. 1a, the method steps of the first embodiment of this invention is illustrated through a flow diagram. In order to achieve best in class status, the method of the present invention is geared toward achieving high performance with respect to those characteristics sought by customers. The first step involves gathering 12 internal organizational data. The internal organizational data may include but is not limited to the critical design characteristics, critical manufacturing characteristics and critical performance characteristics. The critical design characteristics are those design features valued by customers according to the internal organization's point of view. The critical manufacturing characteristics are defined by manufacturing features historically valued by customers also according to the internal organization's point of view. The critical performance characteristics are the performance features sought by customers. The critical performance characteristics allow manufacturers to measure how well the various components of the product work together to produce optimum results. The second step is the gathering 14 of external organizational data. The external organizational data may be the critical design characteristics, critical manufacturing characteristics, and critical performance characteristics. Again, the critical design characteristics include design features valued by customers. However, the critical design characteristics that form part of the external organizational data are those design features which is suppliers or competitors deem to be valued by customers. The critical manufacturing characteristics and the critical performance characteristics are the manufacturing and performance features historically valued by customers according to the suppliers' and/or competitors' point of view. The critical manufacturing, design and performance characteristics that form the external organizational data are taken from vehicles that have achieved high customer ratings.

The next step involves matching 16 the internal organizational data and the external organizational data. Once the matches are made between the elements of the internal organizational data and the external organizational data, a preliminary list is created where the preliminary list includes the common critical design, manufacturing and performance characteristics.

The next step is performing 18 experimental tests to independently determine critical design characteristics, critical manufacturing characteristics and critical performance characteristics. The experimental tests are performed in order to insure that the characteristics listed in the preliminary list are in fact critical to excellent product performance. Next, the experimental test results are matched 20 or compared against the list of common elements to determine final critical design characteristics, final critical manufacturing characteristics, and final critical performance characteristics.

Finally, categories which illustrate the progress of each feature are defined. With reference to FIGS. 1a and 1b, this involves defining 22 a design-stop category for each final critical design characteristic; defining 24 a design-caution category for each final critical design characteristic by defining 26 a go category for each final critical design characteristic; defining 28 a manufacturing-stop category for each final critical manufacturing characteristic; defining 30 a manufacturing-caution category for each final critical manufacturing characteristic by establishing a range of values; defining 32 a manufacturing-go category for each final critical manufacturing characteristic; defining 34 a performance-stop category for each final critical performance characteristic; defining 35 a performance-caution category for each final critical performance characteristic; and defining 37 a performance-go category for each final performance characteristic. The categories are generally defined by particular ranges of values which correspond to the performance level of each final characteristic. The ranges are based upon the data gathered both internal and external to the organization.

The stop categories or red categories are defined by a range of unique values which correspond to each critical characteristic for development strategies needing repair. For example, where a particular feature or characteristic is greatly falling behind its scheduled development, a stop or red designation will be assigned to that particular feature. The caution categories or yellow categories are defined by a range of unique values which define performance levels which may need some improvement. Similar to the stop or red category, the range of values are unique for each critical characteristic. The go categories or green categories are defined by a range of values which define performance levels that are acceptable. Again, the range of values for the go or green categories are unique for each critical characteristic.

The last step of this process involves designating 39 each feature with one of a stop designation, a yellow designation, or a go designation to illustrate the progress for each final critical design, manufacturing and performance characteristic. With reference to FIG. 2, the designation may include a spreadsheet 36 format where each critical characteristic is listed and is color-coded according to its progress (red 38, yellow 40 or green 42). In order to illustrate the progress with respect to the left versus right components of the vehicle, the progress of the left components is designated by the color of the left component of the circle 43 and the progress of the right components is designated by the color of the right half of the circle. The spreadsheet 36 illustrated in FIG. 2 may also be expanded to include manufacturing and performance characteristics. The spreadsheet 36 is not limited to one type of characteristic. Accordingly, the system for conveying development progress information is illustrated in FIG. 2 and includes but is not limited to a spreadsheet format which is color-coded as described above.

Other embodiments of this invention do not require both manufacturing or design characteristics to be tracked. Either may be tracked, or other features such as cost may be tracked as long as those features are based upon customer wants and needs. Furthermore, other color coding schemes may be implemented as long as those color schemes are predefined so that the audience to the above-referenced spreadsheet can easily understand the status for the development of each feature.

In yet another embodiment of this invention, information is gathered which is both external and internal to the organization in order to determine the critical characteristics. However, independent testing is not necessarily required. Therefore, the preliminary list may be implemented as the list of final design or manufacture characteristics when setting up the color-coded spreadsheet format.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for efficiently and accurately measuring the progress of achieving optimal motor vehicle characteristics that are important to customer satisfaction, the method comprising:

gathering internal organizational data;

gathering external organizational data;

matching the internal organizational data with the external organizational data to create a first list of characteristics, wherein the first list of characteristics comprises characteristics gathered from the internal and external organizational data that are valued by customers according to an organizational point of view;

performing a plurality of tests to determine test characteristics, wherein the test characteristics are determined from vehicles having a best-in-class rating such that the best-in-class ratings indicate the test characteristics that are valued by customers according to one or more publications;

matching the test characteristics with the first list of characteristics to create a second list of characteristics, wherein the second list of characteristics comprises the characteristics of the first list that correspond with the test characteristics such that the characteristics in the second list are valued by customers according to the organizational point of view and according to one or more publications;

defining a stop designation for each characteristic of the second list, the stop designation including a range of values which define performance levels which require repair;

defining a caution designation for each characteristic of the second list by establishing a range of values, the caution designation including a range of values which define performance levels which may be improved;

defining a go designation for each characteristic of the second list, the go designation including a range of values which define performance levels are acceptable;

assigning a designation to each characteristic in the second list to illustrate the progress for each characteristic of the second list.

2. The method recited in claim 1 wherein the step of gathering internal organizational data includes data comprising design characteristics, manufacturing characteristics and performance characteristics, the design characteristics including design features valued by customers, the manufacturing characteristics including manufacturing features valued by customers, the performance characteristics including performance levels sought by customers.

3. The method recited in claim 1 wherein the step of gathering external organizational data includes data comprising design characteristics, manufacturing characteristics and performance characteristics, the design characteristics including design features valued by customers, the manufacturing characteristics including manufacturing features valued by customers and the performance characteristics including performance levels sought by customers.

4. The method recited in claim 1 wherein the list of common characteristics includes common design characteristics, common manufacturing characteristics and common performance characteristics.

5. The method recited in claim 1 wherein the step of defining a stop designation includes defining stop designations for design characteristics, manufacturing characteristics, and performance characteristics.

6. The method recited in claim 1 wherein the step of defining a caution designation includes defining caution designations for design characteristics, manufacturing characteristics, and performance characteristics.

7. The method recited in claim 1 wherein the step of defining a go designation includes defining go designations for design characteristics, manufacturing characteristics, and performance characteristics.

8. The method recited in claim 1 wherein the step of assigning a designation includes illustrating stop designations in red, illustrating caution designations in yellow and illustrating go designations in green.

9. The method recited in claim 1 wherein the step of assigning designations includes presenting the designations in a spread sheet format.

10. The method recited in claim 8 wherein the step of assigning a designation includes presenting the designations in a spread sheet format.

11. A method for efficiently and accurately measuring the progress of achieving motor vehicle characteristics that are important to customer satisfaction, the method comprising:

gathering internal organizational data, the internal organizational data including design characteristics, manufacturing characteristics and performance characteristics, the design characteristics including design features valued by customers, the manufacturing characteristics including manufacturing features valued by customers, the performance characteristics including performance features valued by customers;

gathering external organizational data, the external organizational data including design characteristics, manufacturing characteristics and performance characteristics, the design characteristics including design features valued by customers, the manufacturing characteristics including manufacturing features valued by customers, the performance characteristics including performance features valued by customers;

matching the internal organizational data with the external organizational data to create a preliminary list of design characteristics, manufacturing characteristics, and performance characteristics, wherein the preliminary list of characteristics comprises characteristics gathered from the internal and external organizational data that are valued by customers according to an organizational point of view;

performing tests to determine test design characteristics, test manufacturing characteristics and test performance characteristics, wherein the test characteristics are determined from vehicles having a best-in-class rating such that the best-in-class ratings indicate the test characteristics that are valued by customers according to one or more publications;

matching the test characteristics with the preliminary list of characteristics to create a final list of design characteristics, manufacturing characteristics and performance characteristics, wherein the final list of characteristics comprises the characteristics of the preliminary list that correspond with the test characteristics such that the characteristics in the final list are valued by customers according to the organizational point of view and according to one or more publications;

defining a design-stop designation for each design characteristic in the final list, the design-stop designation including a range of values which define design levels which require repair;

defining a design-caution designation for each design characteristic in the final list by establishing a range of values, the design-caution designation including a range of values which define design levels which may be improved;

defining a design-go designation for each design characteristic in the final list, the design-go designation including a range of values which define design levels which are acceptable;

defining a manufacturing-stop designation for each manufacturing characteristic in the final list, the manufacturing-stop designation including a range of values which define manufacturing methods requiring repair;

defining a manufacturing-caution designation for each manufacturing characteristic in the final list by establishing a range of values, the manufacturing-caution designation including a range of values which define manufacturing which may be improved;

defining a manufacturing-go designation for each manufacturing characteristic in the final list, the manufacturing-go designation including a range of values which define acceptable manufacturing methods;

defining a performance-stop designation for each performance characteristic in the final list, the performance-stop designation including a range of values which define performance levels needing repair;

defining a performance-caution designation for each performance characteristic in the final list by establishing a range of values, the performance-caution designation including a range of values which define performance levels which may be improved;

defining a performance-go designation for each performance characteristic in the final list, the performance-go designation including a range of values which define performance levels which are acceptable; and assigning the designations to each design characteristic in the final list, each manufacturing characteristic in the final list, and each performance characteristic in the final list to illustrate the progress.

12. The method recited in claim 11 wherein the step of assigning the designations includes presenting the designations in a color-coded format.

13. The method recited in claim 11 wherein the step of assigning the designations includes presenting the designations in a spread sheet format.

14. A method for efficiently and accurately measuring the progress of achieving motor vehicle characteristics that are important to customer satisfaction, the method comprising:

gathering internal organizational data, the internal organizational data including design characteristics, the design characteristics including design features valued by customers;

gathering external organizational data, the external organizational data including design characteristics, the design characteristics including design features valued by customers;

matching the internal organizational data with the external organizational data to create a first list of design characteristics, wherein the first list of design characteristics comprises design characteristics gathered from the internal and external organizational data that are valued by customers according to an organizational point of view;

performing tests to determine test design characteristics, wherein the test design characteristics are determined from vehicles having a best-in-class rating such that the best-in-class ratings indicate the test design characteristics that are valued by customers according to one or more publications;

matching the test design characteristics with the first list of design characteristics to create a second list of design characteristics, wherein the second list of design characteristics comprises the design characteristics of the first list that correspond with the test design characteristics such that the design characteristics in the second list are valued by customers according to the organizational point of view and according to one or more publications;

defining a stop designation for each design characteristic in the second list, the stop designation including a range of values which define performance levels which require repair;

defining a caution designation for each design characteristic in the second list by establishing a range of values, the caution designation including a range of values which define performance levels which may be improved;

defining a go designation for each design characteristic in the second list, the go designation including a range of values which define performance levels are acceptable;

assigning one of the stop designations, the yellow designations, or the go designations to illustrate the progress for each design characteristic in the second list.

15. The method recited in claim 14 wherein the step of assigning one of the stop designations, the yellow designations, or the go designations includes presenting the designations in a color-coded format.

16. The method recited in claim 14 wherein the step of assigning one of the stop designations, the yellow designations, or the go designations includes presenting the designations in a spread sheet format.

17. The method recited in claim 15 wherein the step of assigning one of the stop designations, the yellow designations, or the go designations includes presenting the designations in a spread sheet format.

18. A method for efficiently and accurately measuring the progress of achieving motor vehicle characteristics that are important to customer satisfaction, the method comprising:

gathering internal organizational data, the internal organizational data including manufacturing characteristics, the manufacturing characteristics including manufacturing features valued by customers;

gathering external organizational data, the external organizational data including manufacturing characteristics, the manufacturing characteristics including manufacturing features valued by customers;

matching the internal organizational data with the external organizational data to create a first list of manufacturing characteristics, wherein the first list of manufacturing characteristics comprises manufacturing characteristics gathered from the internal and external organizational data that are valued by customers according to an organizational point of view;

performing a plurality of tests to determine test manufacturing characteristics, wherein the test manufacturing characteristics are determined from vehicles having a best-in-class rating such that the best-in-class ratings indicate the test manufacturing characteristics that are valued by customers according to one or more publications;

matching the test manufacturing characteristics with the first list of manufacturing characteristics to create a second list of manufacturing characteristics, wherein the second list of manufacturing characteristics comprises the manufacturing characteristics of the first list that correspond with the test manufacturing characteristics such that the manufacturing characteristics in the second list are valued by customers according to the organizational point of view and according to one or more publications;

defining a stop designation for each manufacturing characteristic in the second list, the stop designation including a range of values which define performance levels which require repair;

defining a caution designation for each manufacturing characteristic in the second list by establishing a range of values, the caution designation including a range of values which define performance levels which may be improved;

defining a go designation for each manufacturing characteristic in the second list, the go designation including a range of values which define performance levels which are acceptable;

assigning one of the stop designations, the caution designations, or the go designations to illustrate the progress for each manufacturing characteristic in the second list.

19. The method recited in claim 18 wherein the step of assigning one of the stop designations, the caution designations, or the go designations includes presenting the designations in a color-coded format.

20. The method recited in claim 18 wherein the step of assigning one of the stop designations, the caution designations, or the go designations includes presenting the designations in a spread sheet format.

21. The method recited in claim 19 wherein the step of assigning one of the stop designations, the caution designations, or the go designations includes presenting the designations in a spread sheet format.

22. A method for efficiently and accurately measuring the progress of achieving motor vehicle characteristics that are important to customer satisfaction, the method comprising:

gathering internal organizational data, the internal organizational data including design characteristics and manufacturing characteristics, the design characteristics including design features valued by customers, the manufacturing characteristics including manufacturing features valued by customers;

gathering external organizational data, the external organizational data including design characteristics and manufacturing characteristics, the design characteristics including design features valued by customers and the manufacturing characteristics including manufacturing features valued by customers;

matching the internal organizational data with the external organizational data to create a preliminary list of design characteristics and manufacturing characteristics, wherein the preliminary list of characteristics comprises characteristics gathered from the internal and external organizational data that are valued by customers according to an organizational point of view;

performing tests to determine test design characteristics and test manufacturing characteristics, wherein the test characteristics are determined from vehicles having a best-in-class rating such that the best-in-class ratings indicate the test characteristics that are valued by customers according to one or more publications;

matching the test design and manufacturing characteristics with the preliminary list of to create a final list of design characteristics and manufacturing characteristics, wherein the final list of characteristics comprises the characteristics of the preliminary list that correspond with the test characteristics such that the characteristics in the final list are valued by customers according to the organizational point of view and according to one or more publications;

defining a design-stop designation for each design characteristic in the final list, the design-stop designation including a range of values which define design levels which require repair;

defining a design-caution designation for each design characteristic in the final list by establishing a range of values, the design-caution designation including a range of values which define design levels which may be improved;

defining a design-go designation for each design characteristic in the final list, the design-go designation including a range of values which define design levels which are acceptable;

defining a manufacturing-stop designation for each manufacturing characteristic in the final list, the manufacturing-stop designation including a range of values which define manufacturing methods requiring repair;

defining a manufacturing-caution designation for each manufacturing characteristic in the final list by establishing a range of values, the manufacturing-caution designation including a range of values which define manufacturing which may be improved;

defining a manufacturing-go designation for each manufacturing characteristic in the final list, the manufacturing-go designation including a range of values which define acceptable manufacturing methods; and assigning the designations to each design characteristic in the final list and each manufacturing characteristic to illustrate the progress.

23. The method recited in claim 22 wherein the step of assigning the designations includes presenting the designations in a color-coded spread sheet format.

* * * * *